(12) United States Patent
Froehlich et al.

(10) Patent No.: US 9,936,199 B2
(45) Date of Patent: Apr. 3, 2018

(54) ENCODING AND DECODING PERCEPTUALLY-QUANTIZED VIDEO CONTENT

(71) Applicant: DOLBY LABORATORIES LICENSING CORPORATION, San Francisco, CA (US)

(72) Inventors: Jan Froehlich, Stuttgart (DE); Robin Atkins, San Jose, CA (US); Qiuwei Wang, College Park, MD (US); Guan-Ming Su, Fremont, CA (US); Peng Yin, Ithaca, NY (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 15/513,928

(22) PCT Filed: Sep. 24, 2015

(86) PCT No.: PCT/US2015/051964
§ 371 (c)(1),
(2) Date: Mar. 23, 2017

(87) PCT Pub. No.: WO2016/049327
PCT Pub. Date: Mar. 31, 2016

(65) Prior Publication Data
US 2017/0251211 A1 Aug. 31, 2017

Related U.S. Application Data

(60) Provisional application No. 62/056,093, filed on Sep. 26, 2014.

(51) Int. Cl.
*H04N 19/186* (2014.01)
*H04N 19/124* (2014.01)
*H04N 9/67* (2006.01)

(52) U.S. Cl.
CPC ............ *H04N 19/124* (2014.11); *H04N 9/67* (2013.01); *H04N 19/186* (2014.11)

(58) Field of Classification Search
CPC .......................... H04N 19/124; H04N 19/186
See application file for complete search history.

(56) References Cited

U.S. PATENT DOCUMENTS 8,036,478 B2 * 10/2011 Kim ...................... H04N 19/50
382/166
8,050,506 B2 * 11/2011 Mizuno ................ H04N 19/647
382/239

(Continued)

FOREIGN PATENT DOCUMENTS

| EP | 1538826 | 6/2005 |
|---|---|---|
| KR | 10-0601944 | 7/2006 |

(Continued)

OTHER PUBLICATIONS

Ebner, F. et al "Development and Testing of a Color Space (IPT) with Improved Hue Uniformity" In color and Imaging Conference, vol. 1998, No. 1, pp. 8-13, Society for Imaging Science and Technology, 1998.

(Continued)

*Primary Examiner* — Jayanti K Patel
*Assistant Examiner* — Irfan Habib
(74) *Attorney, Agent, or Firm* — Konstantinos Konstantinides

(57) ABSTRACT

Compared to traditional gamma-coded video, perceptually quantized video provides greater flexibility for the transmission and display management of high-dynamic range video, but it does not compresses as efficiently using existing standard codecs. Techniques are described to improve the coding efficiency of perceptually coded video by applying a color cross-talk transformation after the RGB/XYZ to LMS transformation. Such a transform increases luma and chroma (Continued)

correlation for color appearance models, but improves perceptual uniformity and overall coding efficiency for wide color gamut, HDR, signals.

22 Claims, 5 Drawing Sheets

(56) References Cited

U.S. PATENT DOCUMENTS

| | | | | |
|---|---|---|---|---|
| 8,755,621 | B2* | 6/2014 | Chiang | H04N 19/172 |
| | | | | 382/239 |
| 9,076,224 | B1* | 7/2015 | Shah | G06T 5/009 |
| 9,077,994 | B2 | 7/2015 | Miller | |
| 9,264,681 | B2 | 2/2016 | Gish | |
| 9,445,109 | B2* | 9/2016 | Bivolarsky | H04N 19/46 |
| 9,497,456 | B2 | 11/2016 | Su | |
| 9,584,811 | B2 | 2/2017 | Su | |
| 9,609,336 | B2* | 3/2017 | Topiwala | H04N 19/164 |
| 9,613,407 | B2 | 4/2017 | Atkins | |
| 9,628,800 | B2* | 4/2017 | Hsieh | H04N 19/122 |
| 9,699,483 | B2* | 7/2017 | Su | H04N 19/98 |
| 9,756,353 | B2* | 9/2017 | Ye | H04N 19/44 |
| 9,769,451 | B2* | 9/2017 | Doutre | H04N 13/0018 |
| 9,788,001 | B2* | 10/2017 | Stauder | H04N 19/30 |
| 2001/0005426 | A1* | 6/2001 | Song | G06F 17/3025 |
| | | | | 382/162 |
| 2005/0105613 | A1* | 5/2005 | Marquant | H04N 19/85 |
| | | | | 375/240.03 |
| 2006/0197777 | A1* | 9/2006 | Cha | H04N 19/34 |
| | | | | 345/600 |
| 2009/0003457 | A1 | 1/2009 | Liu | |
| 2010/0027619 | A1* | 2/2010 | Doser | H04N 19/46 |
| | | | | 375/240.02 |
| 2010/0074328 | A1* | 3/2010 | Zuo | H04N 19/172 |
| | | | | 375/240.03 |
| 2010/0172411 | A1 | 7/2010 | Efremov | |
| 2011/0103467 | A1* | 5/2011 | Wedi | H04N 19/61 |
| | | | | 375/240.03 |
| 2012/0020549 | A1* | 1/2012 | Lee | H04N 13/0022 |
| | | | | 382/154 |
| 2013/0089150 | A1* | 4/2013 | Tanchenko | H04N 19/176 |
| | | | | 375/240.18 |
| 2014/0105278 | A1* | 4/2014 | Bivolarsky | H04N 19/46 |
| | | | | 375/240.03 |
| 2015/0334422 | A1* | 11/2015 | Shaw | H04N 19/139 |
| | | | | 375/240.16 |
| 2015/0358631 | A1* | 12/2015 | Zhang | H04N 19/44 |
| | | | | 375/240.16 |
| 2015/0373327 | A1* | 12/2015 | Zhang | H04N 19/124 |
| | | | | 375/240.03 |
| 2016/0005349 | A1 | 1/2016 | Atkins | |
| 2016/0014420 | A1 | 1/2016 | Su | |
| 2016/0080751 | A1* | 3/2016 | Xiu | H04N 19/124 |
| | | | | 375/240.02 |
| 2016/0100168 | A1* | 4/2016 | Rapaka | H04N 19/124 |
| | | | | 375/240.03 |
| 2016/0227224 | A1* | 8/2016 | Hsieh | H04N 19/124 |
| 2016/0309154 | A1* | 10/2016 | Rusanovskyy | H04N 19/159 |
| 2016/0360205 | A1* | 12/2016 | Chang | H04N 19/136 |
| 2017/0085878 | A1* | 3/2017 | Sole Rojals | H04N 19/124 |
| 2017/0134731 | A1* | 5/2017 | Tourapis | H04N 1/646 |

FOREIGN PATENT DOCUMENTS

| | | |
|---|---|---|
| RU | 2335017 | 9/2008 |
| RU | 2504011 | 1/2014 |
| WO | 2014/130343 | 8/2014 |

OTHER PUBLICATIONS

Moroney, N. et al "The CIECAM02 Color Appearance Model" Rochester Institute of Technology RIT Scholar Works, In Color and Imaging Conference, No. 1, pp. 23-27, Society for Imaging Science and Technology, Nov. 12, 2002.

ITU-R, "Recommendation BT.709—Basic Parameter Values for the HDTV Standard for the Studio and for International Programme Exchange", Geneva, ITU, 1990.

ITU-R, "Recommendation ITU-R BT2020—Parameter Values for Ultra-High Definition Television Systems for Production and International Programme Exchange", Geneva, ITU, 2012.

Li, C. et al "A Modification of CIECAM02 Based on the Hunt-Pointer-Estevez Matrix", Journal of Imaging Science & Technology, vol. 57, Issue 3, pp. 1-9, 2013.

Katoh, N. et al Gamut Mapping for Computer Generated Images (II), Color and Imaging Conference, 4th Color and Imaging Conference Final Program and Proceedings, pp. 126-128, Society for Imaging Science and Technology, Jan. 1, 1996.

SMPTE Standard 2084:2014 "High Dynamic Range Electro-Optical Transfer Function of Mastering Reference Displays".

* cited by examiner

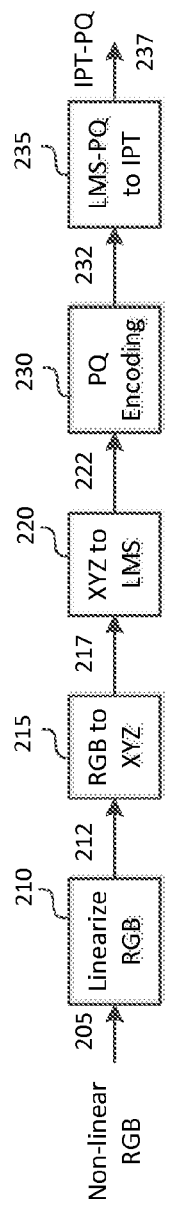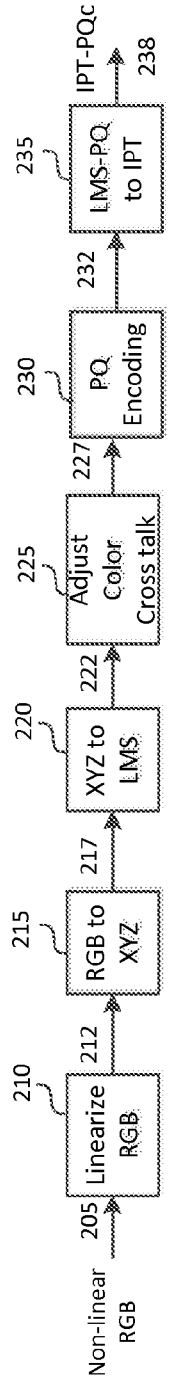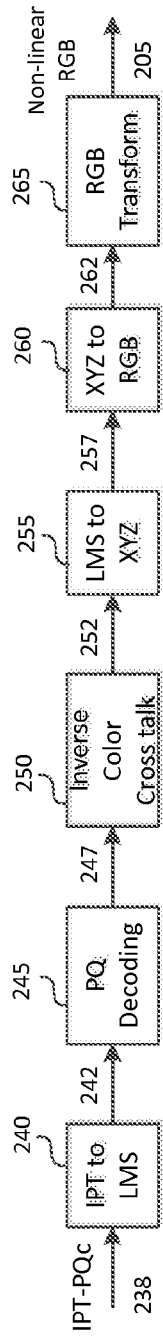
FIG. 2A
FIG. 2B
FIG. 2C

ENCODING AND DECODING PERCEPTUALLY-QUANTIZED VIDEO CONTENT

CROSS REFERENCE TO RELATED APPLICATIONS

This application claims priority to U.S. Provisional Patent Application No. 62/056,093, filed on Sep. 26, 2014, which is hereby incorporated by reference in its entirety.

TECHNOLOGY

The present invention relates generally to images. More particularly, an embodiment of the present invention relates to encoding, decoding, and display management of perceptually-quantized video.

BACKGROUND

Video signals may be characterized by multiple parameters, such as bit-depth, color space, color gamut, and resolution. An important aspect of a video signal's characteristic is it dynamic range. Dynamic range (DR) is a range of intensity (e.g., luminance, luma) in an image, e.g., from darkest darks to brightest brights. As used herein, the term 'dynamic range' (DR) may relate to a capability of the human psychovisual system (HVS) to perceive a range of intensity (e.g., luminance, luma) in an image, e.g., from darkest darks to brightest brights. In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 orders of magnitude of the human visual system (HVS) (e.g., 1:10, 000). In practice, images comprise one or more color components (e.g., luma Y and chroma Cb and Cr) wherein each color component is represented by a precision of n-bits per pixel (e.g., n=8). For example, using linear or classic gamma luminance coding (e.g., per ITU Rec. 709), images where n≤8 (e.g., color 24-bit JPEG images) and a dynamic range of 1:100 to about 1:1000 are considered images of standard dynamic range, while images where n>8 and higher dynamic range may be considered images of high dynamic range. HDR images may also be stored and distributed using low bit-depth, non-linear luminance coding (e.g., 10-bits and logarithmic luminance coding), or high-precision (e.g., 16-bit) floating-point formats, such as the OpenEXR file format developed by Industrial Light and Magic.

HDR images may need to be encoded and transmitted with encoders that don't support their full dynamic range. For example, a video codec may support only 8-bit or 10-bit video data, a bit-depth much lower than the typical bit depth of 12-16 bits for HDR video. Pre-processing or post-processing of HDR video using perceptual quantization, such as the one described in the SMPTE Standard ST 2084 (2014) "Perceptually-based EOTF", which is incorporated herein by reference in its entirety, may reduce the bit-depth requirements; however, it may affect coding efficiency, since coding standards are typically optimized for gamma-coded YCbCr video signals. As appreciated by the inventors here, improved techniques for encoding and decoding of perceptually-quantized video are desirable.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which:

FIG. 2A depicts an example data flow for converting a gamma-coded or PQ-coded RGB signal into the IPT-PQ color space;

FIG. 2B depicts an example data flow for converting a gamma-coded or PQ-coded RGB signal into a modified IPT-PQ color space according to an embodiment of this invention;

FIG. 2C depicts an example data flow for converting an IPT-PQ signal into a gamma-coded or a PQ-coded RGB signal according to an embodiment of this invention;

DESCRIPTION OF EXAMPLE EMBODIMENTS

Figure 1A:
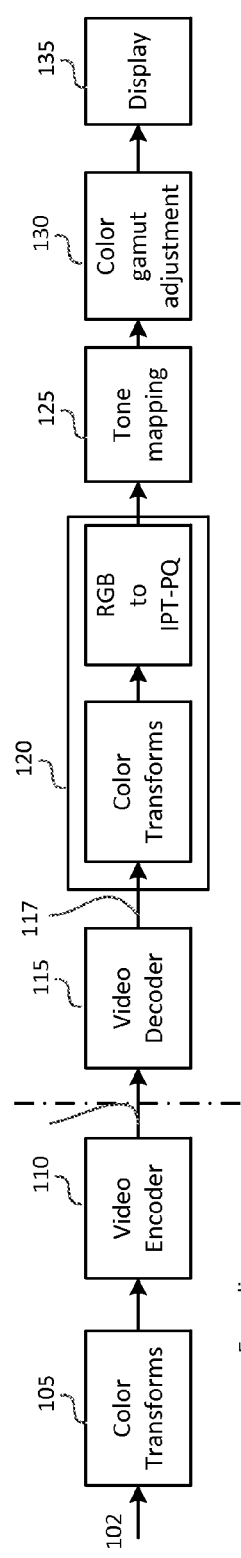
FIG. 1A depicts an example implementation of a processing pipeline for encoding and decoding HDR video in a non-perceptually-quantized color space.

Coding and decoding techniques for perceptually-quantized video signals are described herein.

In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily obscuring the present invention.

Overview

Example embodiments described herein relate to encoding and decoding techniques for perceptually-quantized video signals. A first HDR video signal is accessed in a first color space (e.g., RGB-PQ or RGB gamma). One or more color transformations are applied to the first video signal to generate an output video signal in a perceptually-quantized opponent color space (e.g., IPT-PQ). The output video signal is compressed with a video encoder to generate a coded bit stream, wherein applying one or more color transformations to the first video signal to generate the output video signal further comprises: applying a first color transform to the first video signal to generate a second video signal in a linear primary color space (e.g. linear LMS); applying a color cross-talk transformation matrix (C) to the second video signal to generate a third video signal in the linear primary color space; applying a perceptual quantizer to the third video signal to generate a fourth video signal in a perceptually quantized primary color space (e.g., LMS-PQ); and, applying a second color transform to the fourth video signal to generate the output video signal in the perceptually-quantized opponent color space (e.g., IPT-PQc).

In another embodiment, in a decoder, a coded bit stream is decoded to generate a first HDR signal in a perceptually-quantized opponent color space (e.g., IPT-PQ). One or more color transformations are applied to the first HDR signal to generate a second video signal in a first linear primary color space (e.g., linear LMS). Then, an inverse of a color cross-talk transformation matrix is applied to the second video signal generate a third video signal in the linear primary color space, and finally a second set of color transformations are applied to the third video signal to generate a fourth video signal in the desired color space (e.g., RGB-gamma or RGB-PQ).

In an embodiment, video encoding and decoding is performed in the same perceptually quantized color space (e.g., IPT-PQ) as display management which is performed following the video decoding. In such an embodiment, look-up tables related to backward reshaping and tone-mapping may be combined to reduce the number of operations in the decoder.

In an embodiment, when encoding and decoding in a perceptually quantized color space, before encoding, the luma component may be reshaped with a non-linear function and the chroma components may be reshaped by a linear chroma reshaping function so that the dynamic range ratio between the luma and chroma channels is preserved. These reshaping functions are reversed in the decoder before applying any display management processing.

Encoding and Decoding of HDR Signals

FIG. 1A depicts an example implementation of a coding and decoding pipeline for HDR video signals. Input (102) may be an HDR video signal captured by an HDR camera or it may represent the output of a video post-processing process which includes a variety of image and video processing steps, such as video editing, color grading, and the like. Before being compressed by video encoder (110), video signal (102) may also be processed by the color transforms unit (105) so that the color format at the input of video encoder (110) matches the supported color formats for which the encoder has been optimized. For example, if the input (102) is in the RGB 4:4:4 color format and the video encoder (110) operates in the YCbCr 4:2:0 format, then unit (105) may perform the RGB to YCbCr color transformations and color sub-sampling.

Video encoder (110) may be a single-layer encoder or a multi-layer encoder using any of known in the art video compression schemes, such as MPEG-2, MPEG-4 (part 4), H.264, H.265 (HEVC), VP8, and the like. The output of video encoder (110) may be stored in storage media (e.g., a hard drive or optical media) or it may be transmitted downstream to be decoded by a receiving device, such as a set-top box, a media player, and the like. On the receiver, video decoder (115) reverses the steps performed by video encoder (110) to generate a decompressed video signal (117) to be displayed on a target display (135). Display (135) may or may not match the characteristics of a reference display that was used to generate the video signal (102). For example, video signal (102) may be color graded using a 2,000 nits display; however, the target display (135), may be 1,000 nits or lower. In order to match the characteristics of the target display (135), in some embodiments, the receiver (or the display itself) may perform a variety of video signal processing steps, such as color transformations and tone mapping. These processing steps are commonly referred to as 'display management.' Examples of display management processes are described in PCT Application with Ser. No. PCT/US2014/016304 (to be referred to as the '304 Application), filed on Feb. 13, 2014, and U.S. Provisional Application with Ser. No. 62/020,622 (to be referred to as the '622 Application), filed on Jul. 3, 2014, (also filed as U.S. patent application Ser. No. 14/755,755), both of which are incorporated herein by reference in their entirety.

As depicted in FIG. 1A, and described in the '304 Application, in some embodiments the display management process for HDR video signals (e.g., steps 125 and 130) may benefit if it is performed using a perceptually corrected or perceptually quantized color space, such as IPT-PQ. The IPT color space, as described in "*Development and testing of a color space (ipt) with improved hue uniformity*", by F. Ebner and M. D. Fairchild, in Proc. $6^{th}$ Color Imaging Conference: Color Science, Systems, and Applications, IS&T, Scottsdale, Ariz., November 1998, pp. 8-13 (to be referred as the Ebner paper), which is incorporated herein by reference in its entirety, is a model of the color difference between cones in the human visual system. In this sense it is like the YCbCr or CIE-Lab color spaces; however, it has been shown in some scientific studies to better mimic human visual processing than these spaces. Like CIE-Lab, IPT is a normalized space to some reference luminance. In an embodiment, the normalization is based on the maximum luminance of the target display.

The YCbCr, YUV, IPT, Lab, and the like, color spaces are commonly referred to as opponent color spaces since they describe a signal using a luminance component (say, Y or I) and two chroma or chroma-difference components (say, CbCr or PT). In contrast, the RGB, LMS, XYZ, and the like color spaces are commonly referred to as primary color spaces. In image and video compression, it is preferred to operate in opponent color spaces rather than primary color spaces since in opponent color spaces the color components are less interrelated, and chroma components may be sub-sampled before compression without any perceptual loss, thus improving overall compressibility.

The term "PQ" as used herein refers to perceptual quantization. The human visual system responds to increasing light levels in a very non-linear way. A human's ability to see a stimulus is affected by the luminance of that stimulus, the size of the stimulus, the spatial frequency(ies) making up the stimulus, and the luminance level that the eyes have adapted to at the particular moment one is viewing the stimulus. In a preferred embodiment, a perceptual quantizer function maps linear input gray levels to output gray levels that better match the contrast sensitivity thresholds in the human visual system. Examples of PQ mapping functions are described in the SMPTE ST 2084:2014 specification and in PCT Application with Ser. No. PCT/US2012/068212 (to be referred as the '212 application) titled "Perceptual luminance nonlinearity-based image data exchange across different display capabilities," by J. S. Miller et al., filed on Dec. 6, 2012, and incorporated herein by reference in its entirety, where given a fixed stimulus size, for every luminance level (i.e., the stimulus level), a minimum visible contrast step at that luminance level is selected according to the most sensitive adaptation level and the most sensitive spatial frequency (according to HVS models). Compared to the traditional gamma curve, which represents the response curve of a physical cathode ray tube (CRT) device and coincidentally may have a very rough similarity to the way the human visual system responds, a PQ curve, as determined by the '212 application, imitates the true visual response of the human visual system using a relatively simple functional model. As used herein, the terms RGB-PQ, IPT-PQ, YCbCr-PQ, and the like, denote color spaces for which at least one color channel has been re-mapped or quantized using a perceptual quantization function.

Table 1 describes the calculation of the Perceptual Curve electro-optical transfer function (EOTF) for converting digital video code values into absolute linear luminance levels at a point of display. Also included is the inverse OETF calculation for converting absolute linear luminance into digital code values

TABLE 1

Exemplary Equation Definitions:

D = Perceptual Curve digital code value, SDI-legal unsigned integer, 10 or 12 bits
b = number of bits per component in digital signal representation, 10 or 12
V = normalized Perceptual Curve signal value, $0 \le V \le 1$
Y = normalized luminance value, $0 \le Y \le 1$
L = absolute luminance value, $0 \le L \le 10{,}000$ cd/m²
Exemplary EOTF Decode Equations:

$$V = \frac{D - 4 \cdot 2^{b-10}}{1015 \cdot 2^{b-10}} \tag{t1}$$

$$Y = \left( \frac{\max[(V^{1/m} - c_1), 0]}{c_2 - c_3 V^{1/m}} \right)^{1/n}$$

$L = 10{,}000 \cdot Y$
Exemplary Inverse EOTF Encode Equations:

$$Y = \frac{L}{10{,}000}$$

$$V = \left( \frac{c_1 + c_2 Y^n}{1 + c_3 Y^n} \right)^m \tag{t2}$$

$$D = \text{INT}(1015 \cdot V \cdot 2^{b-10}) + 4 \cdot 2^{b-10} \tag{t3}$$

Exemplary Constants:

$$n = \frac{2610}{4096} \times \frac{1}{4} \approx 0.15930176$$

$$m = \frac{2523}{4096} \times 128 = 78.84375$$

$$c_1 = c_3 - c_2 + 1 = \frac{3424}{4096} = 0.8359375$$

$$c_2 = \frac{2413}{4096} \times 32 = 18.8515625$$

$$c_3 = \frac{2392}{4096} \times 32 = 18.6875$$

Notes:
1. The operator INT returns the value of 0 for fractional parts in the range of 0 to 0.4999 . . . and +1 for fractional parts in the range of 0.5 to 0.9999 . . . , i.e. it rounds up fractions above 0.5.
2. All constants are defined as exact multiples of 12 bit rationals to avoid rounding concerns.
3. R, G, or B signal components are to be computed in the same way as the Y signal component described above.

As depicted in FIG. 1A, operating in a perceptually-corrected or perceptually-quantized color space (such as IPT-PQ) may require a number of processing steps (120), such as: chroma up-sampling and a first linear color transform (e.g., from YCbCr 4:2:0 to RGB 4:4:4), followed by a second non-linear color transform (e.g., from RGB to IPT-PQ). As an example, FIG. 2A and its corresponding description later on in this specification depict in more detail a processing pipeline for an RGB to IPT-PQ color transformation.

While operating in the IPT-PQ space may enhance the output of the tone-mapping (125) and color gamut adjustment (130) operations, the required color transforms (120) to transform incoming signal (117) to such a color space may be beyond the capabilities of some devices, such as portable computing tablets or smart phones. Hence, in some embodiments, it is desirable to reduce the decoder complexity by transferring some of the operations into the encoder. For example, in an embodiment, it would be desirable to perform the whole encoding process in a perceptually corrected color space (e.g., IPT-PQ) so that color transformations (120) could be reduced or completely eliminated in the decoder. Unfortunately, existing video coding schemes are optimized for gamma-coded, standard dynamic range video signals, typically coded in the YCbCr color space. As appreciated by the inventors, using existing video codecs with HDR signals in perceptually-corrected color space requires some additional steps, such as those described herein.

Forward and Backward Signal Reshaping

Figure 1B:
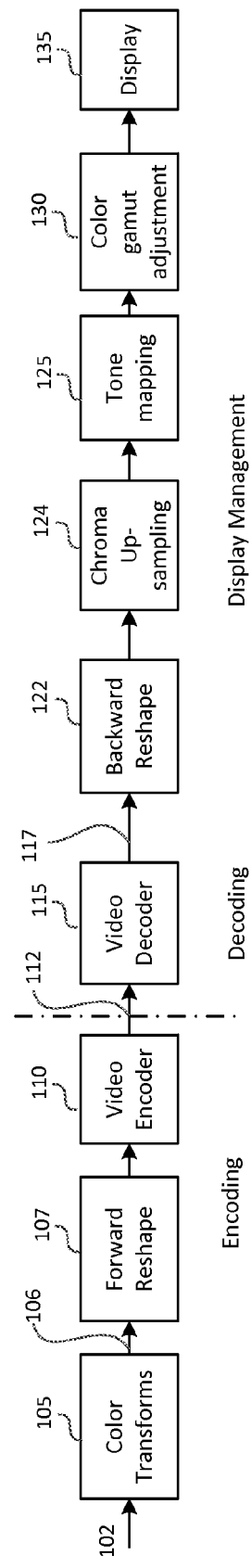
FIG. 1B, FIG. 1C, and FIG. 1D depict example implementations of processing pipelines for encoding and decoding HDR video in a perceptually-quantized color space according to embodiments of the present invention.

FIG. 1B depicts an example embodiment for the encoding and decoding of HDR video coded in a perceptually-corrected color space, (e.g., IPT-PQ). In an embodiment, input (102) may already be in a perceptually-coded color space (e.g., RGB-PQ). Color transforms step (105) transform the color space of the input signal (102) from the input color space (e.g., RGB-PQ 4:4:4) into a perceptually-corrected color format suitable for encoding using video encoder (110) (e.g., IPT-PQ 4:2:0). To take advantage of existing video compression schemes, before encoding (110), in an embodiment, the perceptually coded input is reshaped by forward reshape process (107). An example of a forward reshaping process is described in PCT Application PCT/US2014/031716 (to be referred to as the '716 Application), titled "Encoding perceptually-quantized video content in multi-layer VDR coding," filed on Mar. 25, 2014 and incorporated herein by reference in its entirety. Reshaping functions may be applied only to the luma channel or to all channels. In some embodiments, luma and chroma channels may employ different reshaping functions.

As described in the '716 application, for PQ-coded signals, in an embodiment, the signal reshaping function (107) may be expressed as:

$$s_i = \text{round}\left( (c_H - c_L) \left( \frac{v_i - v_L}{v_H - v_L} \right)^\alpha + c_L \right), \tag{1}$$

where $v_L$ and $v_H$ denote the minimal value and maximal values in a color channel under consideration of the input HDR signal (102), and $c_L$ and $c_H$ denote the corresponding minimal and maximal output values, $v_i$ denotes an i-th input pixel and $s_i$ denotes the corresponding output. For example, in an embodiment, for normalized color values within (0,1), in a single layer system, $c_L = 0$ and $c_H = 1$. The value of $\alpha$ is constant, but may be adapted and changed on a per frame, per scene, or other suitable criterion basis. In an embodiment, if the input to the reshaping function is PQ-coded, then $\alpha>1$, otherwise, if it is gamma-coded, then $\alpha<1$.

In a decoder, in an embodiment, the inverse shaping or backward reshaping operation (122) can be expressed as $$\hat{v}_i = (v_H - v_L) \left( \frac{\hat{s}_i - c_L}{c_H - c_L} \right)^{1/\alpha} + v_L. \quad (2)$$

where for a decoded input pixel $\hat{s}_i$, $\hat{v}_i$ denotes the corresponding output. In practice, the forward and backward reshaping operations may be performed using look-up tables (LUTs).

Given the decoded signal (117) is already in a perceptually-coded color space, the display management operations (e.g., 125, and 130) require only a much simpler chroma up-sampling (e.g., from 4:2:0 to 4:4:4). In some embodiments, chroma-up sampling operations may be performed before the backward-reshaping operation (122) as part of the video decoder (115), since the video decoder may support such an operation directly in hardware.

Figure 1C:
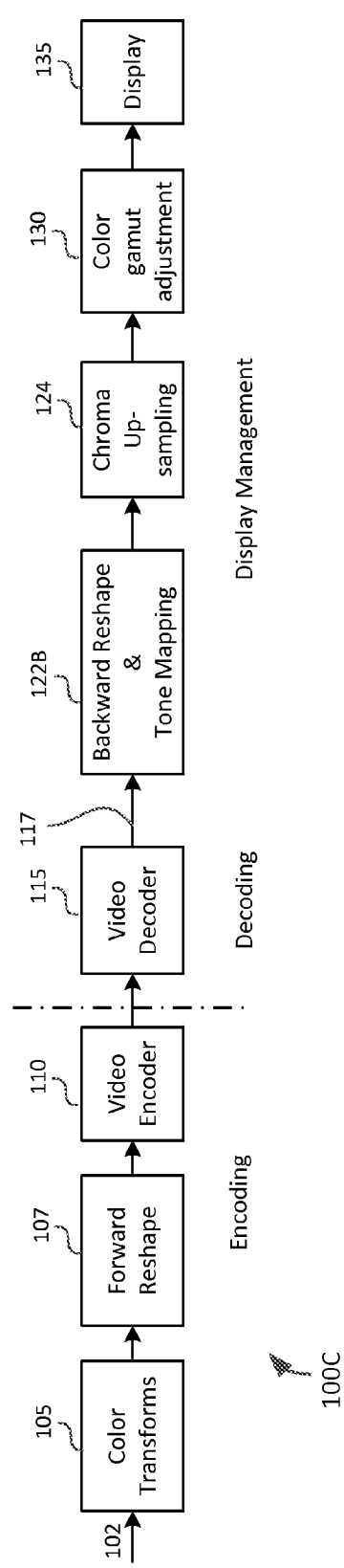

FIG. 1C depicts a variation of the (100B) system depicted in FIG. 1B, by combining together the backward reshaping and tone mapping operations into a single unit (122B), typically a set of LUTs. As discussed earlier, video encoding (110) and video decoding (115) may be performed using either a single layer coding system (e.g., video encoder (110) may utilize a single 10-bit H.264 or H.265 video encoder) or a dual layer coding system (e.g., video encoder (110) may apply two or more 8-bit H.264 or H.265 video encoders as described in PCT Application Ser. No. PCT/US2014/042583, filed on Jun. 16, 2014, which is incorporated herein by reference in its entirety.) Assuming that tone mapping is performed independently on each color channel, the two functions can be integrated as follows:

For a single layer codec, let $$y = S(x) \quad (3)$$

describe a look-up table to generate the output of the reshaping function y given a decoded signal x. Let also $$z = T(y) \quad (4)$$

describe a look-up table to generate the output of the tone-mapping function z given input y. Then, the two LUTs can be merged as $$z = T(S(x)) = K(x). \quad (5)$$

For example, for a 10-bit input x, K(x) may have 1024 entries.

In a dual-layer codec, there is typically an 8-bit base layer (BL) and an 8-bit enhancement layer (EL), each with its own reshaping unit. Let $S_B(x_B)$ and $S_E(x_E)$ denote the base and enhancement layer backward reshaping functions used to generate the final HDR signal. Given $$y = S_B(x_B) + S_E(x_E), \quad (6)$$

then a 2D LUT $$U(x_B, x_E) = T(S_B(x_B) + S_B(x_E)), \quad (7)$$

may be used to combine the two operations. For 8-bit input data and 10-bit output data, such a LUT would require about 256*256*2=131 Kbytes for each color channel.

Note that the chroma up-sampling module (124) may also be integrated with the operations of the video decoder (115) to take advantage of any available hardware accelerators in the receiver.

Figure 1D:
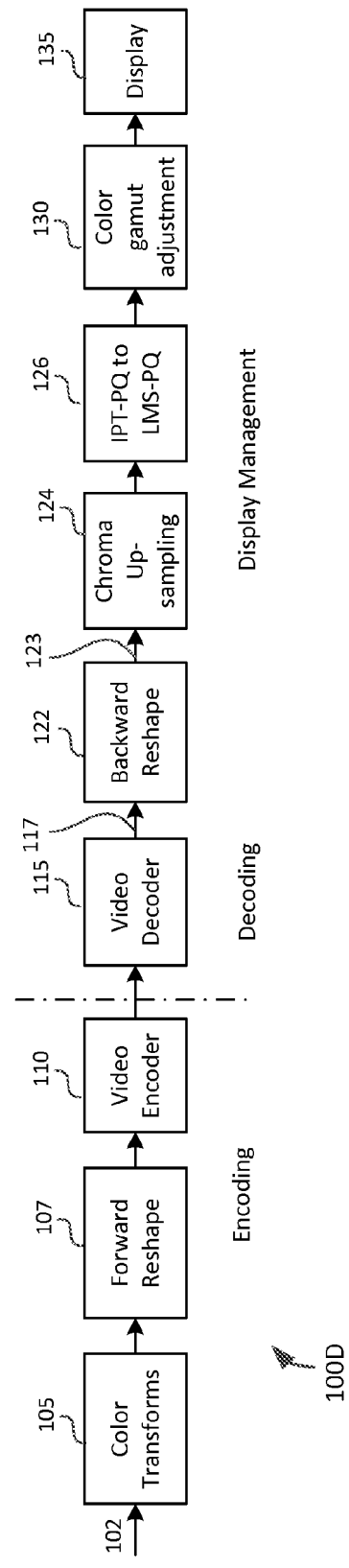

In some embodiments, even though encoding, decoding and display management are all performed in a perceptual color space (e.g., IPT-PQ), multiple such color spaces may be used. For example, coding and decoding may be performed in an opponent color space (e.g., IPT-PQ or YCbCr-PQ), but display management may be performed in a primary color space (e.g., RGB-PQ). Such an example implementation is depicted in FIG. 1D according to another embodiment where encoding and decoding are performed in the IPT-PQ color space, but display management is performed in the LMS-PQ color space. An example of a display management process in the LMS-PQ space is described in the '622 Application. As described in the '622 Application, and partially depicted in FIG. 2A, transforming video data into the LMS-PQ color space may incorporate the following steps:

a) If needed (not shown), performing chroma up-sampling and other color transformations (e.g., IPT-PQ to RGB) to convert the decoded signal into either a gamma coded RGB or an RGB-PQ coded signal (205).

b) Linearizing the RGB signal (step 210). The decoded HDR signal (123) may be gamma coded or PQ coded, which is typically signaled using metadata embedded in the coded bitstream, such as the EOTF field, to reverse or undo the source display's conversion from code values to luminance. For example, if the input signal is gamma coded, then this step applies an inverse gamma function. If the input signal is PQ-encoded according to the "212 PCT Application, then this step applies an inverse PQ function. In practice, this linearization step may be performed using three pre-computed 1-D Look-up tables (LUTs).

c) Transforming from linear RGB to LMS (steps 215 and 220). In this step, the output signal (212) of step b) is transformed into the LMS color space. Typically, this step is performed by applying a 3×3 matrix controlled by input metadata.

d) PQ encoding (230) is applied to each of the L, M, and S color components to generate an output (232) in the LMS-PQ color space. This step can also be performed using three 1-D LUTs. In some embodiments, the complete color transformation pipeline (e.g., IPT-PQ to LMS-PQ) may be computed using a 3D LUT. If display management is performed in the IPT-PQ space instead of the LMS-PQ, then an additional LMS to IPT color transformation (235) is applied to the LMS-PQ signal (232) to generate the IPT-PQ signal (237).

In some embodiments, it is less computationally-intensive to perform display management in the LMS-PQ space; however, the color channels in the LMS-PQ color space are highly correlated so it is not efficient to operate the video encoders (110) and decoders (115) in this space; hence the encoder-decoder pair needs to operate in a different color space; typically, an opponent color space such as YCbCr or IPT.

In some embodiments it may be preferred to encode HDR video signals using a perceptual opponent color space (such as YCbCr-PQ or IPT-PQ) to reduce the overall bit-depth requirements for the video encoder (110) and decoder (115). The next section describes a method to improve coding efficiency when coding in the IPT-PQ color space.

Enhanced Perceptual Uniformity

In color science, and as used herein, the term "color appearance model" denotes "any model that includes predictors of at least the relative color appearance attributes of lightness, chroma, and hue." (M. D. Fairchild, "Color Appearance Models," Second Edition, John Wiley and Sons, 2005.) Examples of such models include CIE L*a*b*

(CIELAB), IPT, and CIECAM02. As depicted in FIG. 2A, and will be discussed in more detail later, given an RGB signal, it can be translated to such a color space using the following steps:
 a) Transform for CIE XYX or any other RGB encoding to a linear tristimulus space close to the LMS cone fundamental space (steps 215, 220)
 b) Apply an optional chromatic adaptation transform, typically via linear scaling (not shown)
 c) Apply a non-linear transform, such as PQ encoding (230)
 d) Apply some additional processing (e.g., 235) to further de-correlate the color channels This approach results in good perceptual uniformity and hue linearity for non-wide gamut color spaces like ITU Rec. 709; however, it fails to precisely predict color appearance for wide-gamut colors, such as Rec. 2020, typically used for HDR imaging. There are existing proposals to overcome the numerical problems of CIECAM02, but these don't solve the issue of over exaggerating the color difference for low amplitude color contributions in one RGB channel in the presence of high-amplitude color stimuli of another color channel. Thus, to the best of the inventor's knowledge, there is no accurate color appearance model for wide color stimuli. In an embodiment, a new color cross-talk transformation step, after the XYZ to LMS step, significantly enhances perceptual uniformity, hue linearity, and encoding efficiency for saturated colors in color appearance models. Such enhanced color models can be used in both image and video coding and display management. As an example, in the next Section, a cross-talk transformation matrix is derived for the IPT-PQ color space; however, similar approaches can be applied to other color appearance models.

Improved Perceptual Uniformity and Code-Word Usage in the IPT-PQ Color Space

As described earlier, and also depicted in FIG. 2A, an RGB to IPT-PQ color transformation may be performed using the following steps:
 a) Normalizing the pixel values of the input signal (102) (e.g., 0 to 4095) into pixel values with a dynamic range between 0 and 1.
 b) (Step 210) Using the EOTF (as may be provided by input metadata), linearizing the input signal. For example, if the input signal (205) is gamma coded, then this step applies an inverse gamma function. If the input signal is PQ-encoded according to the "212 PCT application, then this step applies an inverse PQ function.
 c) (Steps 215 and 220) Converting the output of step b) (e.g., signal 212) to the LMS color space. This step typically includes an RGB to XYZ transformation (step 215), followed by an XYZ to LMS transformation (step 220).
 d) According to the Ebner paper, the traditional LMS to IPT color space conversion comprises applying first a non-linear power function to the LMS data and then applying a linear transformation matrix. While one can transform the data from LMS to IPT and then apply the PQ function to be in the IPT-PQ domain, in a preferred embodiment, in this step (230), the traditional power function for a non-linear encoding of LMS to IPT is replaced with the PQ non-linear encoding. For example, the non-linear L, M, and S values are computed the same way as the V signal in equation (t2), where the Y signal is replaced by the linear L, M, or S component values. In some embodiments, a normalized version of PQ encoding may be used, wherein the step of equation (t3) may be omitted and the range of output PQ values is between 0 and 1.
 e) Using a standard LMS to IPT linear transform, this step (235) completes the conversion of the output of step d) (e.g., signal 232) to the IPT-PQ color space.

For simplicity, let's assume that any color space is defined over a normalized 3-D cube within the [0 1] range of values, where 1 denotes the maximum possible pixel value for a given bit depth. To improve coding efficiency, in a preferred embodiment, after each transformation to a perceptually-coded color space, a separate color transformation may be applied to appropriately shift the chroma components.

Figure 3A:
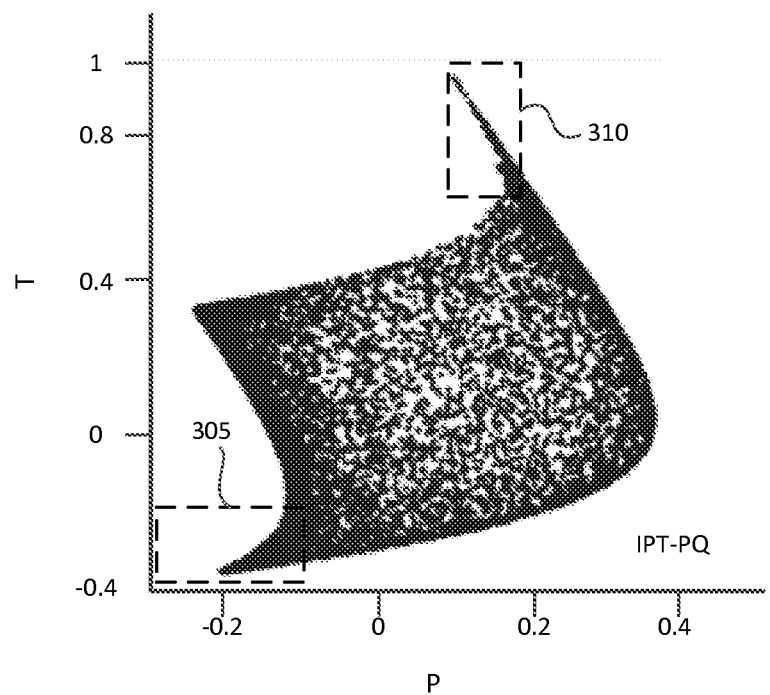
FIG. 3A and FIG. 3B depict examples of P versus T correlation after mapping RGB-PQ points into the IPT-PQ and IPT-PQc spaces according to embodiments of this invention.

Consider the mapping of PQ-coded RGB values (205) to the IPT-PQ color space. This mapping is highly non-linear and transforms the RGB-PQ cube into a non-cube shape. As an example, FIG. 3A depicts the P versus T correlation after mapping approximately 10,000 RGB-PQ points into the IPT-PQ space. One observes that the original RGB-PQ cube is not a cube any more. In the IPT-PQ space, there are two tails: one short tail in the region P[−0.3, −0.1]×T[−0.4, −0.2](305), and the other long tail in the region P[0.1, 0.2]×T[0.6, 1](310). The long tail of the IPT-PQ space leads to inefficient allocation of code words because of the empty spaces left unused around the tail. These tails also appear to have no perceptual significance.

Consider now the RGB to IPT-PQ color transform pipeline as depicted in FIG. 2B. As depicted in FIG. 2B, an additional step (225) to adjust the channel cross talk is applied to the linear LMS data (222) before applying the non-liner PQ encoding (230). Let $$\begin{bmatrix} L_c \\ M_c \\ S_c \end{bmatrix} = C * [L\ M\ S]^T = \begin{bmatrix} 1-2c & c & c \\ c & 1-2c & c \\ c & c & 1-2c \end{bmatrix} * \begin{bmatrix} L \\ M \\ S \end{bmatrix}. \quad (8)$$

denote without limitation an example of a color-channel cross-talk adjustment (225) of the input LMS data into transformed LMS ($LMS_c$) data, where C denotes a 3×3 color cross-talk transformation matrix, where c is a constant that controls the level of cross-talk between the three color components (e.g., c=0.02 or c=0.04). In some embodiments, C may be defined by more than one variable parameter. In some embodiments, the RGB to LMS (215, 220) and LMS to LMSc steps (225) may be combined into a single step, so that adding the cross-talk transformation adds no additional computation to the color processing pipeline.

Figure 3B:
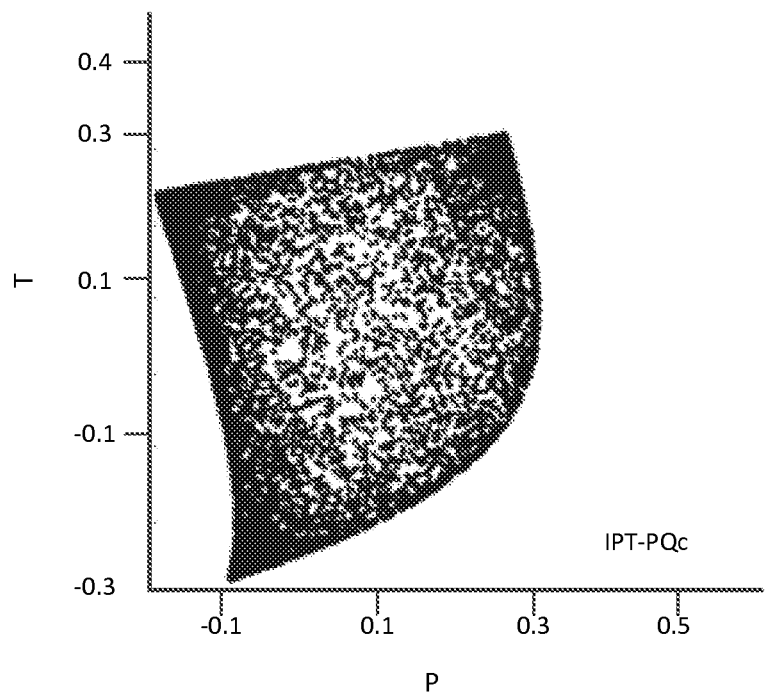

Let IPT-PQc denote the transformed color space when applying the color cross-talk transform (225), then FIG. 3B depicts the P versus T correlation after mapping approximately 10,000 RGB-PQ points into the IPT-PQc space. As depicted in FIG. 3B, the IPT-PQc color space allows for improved code-word usage, hence more efficient compression. In some embodiments, the parameter c in equation (8) may be adjusted on a per frame or per scene basis to optimally adjust code-word utilization. Then, this value may be transmitted to a decoder as part of the metadata in the coded bit stream.

FIG. 2C depicts the color processing pipeline for transforming a signal (238) from the IPT-PQ or IPT-PQc color space to a signal (205) in RGB gamma-coded or RGB-PQ-coded color space. Step (250), applying the inverse color cross-talk of equation (8) (e.g., $C^{-1}$), may be eliminated if the input (237) is coded in the IPT-PQ color space (i.e., without the chroma cross-talk adjustment). The remaining steps include:

a) (Step 240) Applying the inverse IPT transform to the IPT-PQ input (238) to generate PQ-coded LMS data (242).
b) (Step 245) Removing the PQ coding from the PQ-coded LMS data (242) to generate linear LMS data (247)
c) After the optional step (250) to inverse the color cross talk applied during encoding (e.g., 225), translating linear LMS data (252) or (247) to linear RGB data (262) (steps 255 and 260), and
d) (Step 265) Converting, as needed, the linear RGB signal (262) into either gamma-coded or PQ-coded RGB data.

As before, applying the inverse cross-talk matrix (250) may be combined with the LMS to RGB color transformation steps (255, 260).

Determining the Color Cross-Talk Transformation Matrix

From equation (8), the color cross-talk transformation matrix can be fully determined by the variable c. Increasing c increases the efficiency of the P/T code-words; however, it decreases overall compression efficiency, since it increases the correlation between the I and P/T components. For a given c value, let Pmax(c) and Pmin(c) denote the maximum value and minimal values in the P channel, and let Tmax(c) and Tmin(c) denote the maximum value and minimal values in the T channel. In an embodiment, the chroma (P/T) domain may be subdivided into AR(c)=M(c)×N(c) regions, where each region is D×D (e.g., D=0.01), and $$M(c) = \frac{Pmax(c) - Pmin(c)}{D}, \quad (9)$$

$$N(c) = \frac{Tmax(c) - Tmin(c)}{D}.$$

Let UR(c) denote the code word usage within the AR(c) range. In an embodiment Table 2 shows in pseudo-code an example on how to determine UR(c).

TABLE 2

```
UR( c ) = 0;
    for( m = 0; m < M(c); m ++ ){   // for all grid elements
        for( n = 0; n < N(c); n++ ){
            for( a set of possible RGB(x,y) values) {   //for all ( P, T ) pixels
                if( ( P(x,y) >= Pmin( c ) + m*D ) &&
                    ( P(x,y) < Pmin( c ) + (m+1)*D ) &&
                    ( T(x,y) >= Tmin( c ) + n*D ) &&
                    ( T(x,y) < Tmin( c ) + (n+1)*D ) ) {
                    UR( c ) ++;
                }
            } // end of RGB(x,y) values
        } // end of n
    } // end of m
```

As used herein, the term "a set of possible RGB(x,y) values," denotes, without limitation, a set or sub-set of possible input RGB values used to derive output IPT-PQc values, such as those detected in a frame or scene of the input video, or the entire possible RGB space. In general, a higher number of such samples lends to a more accurate estimate of the cross-talk transformation matrix.

Figure 4:
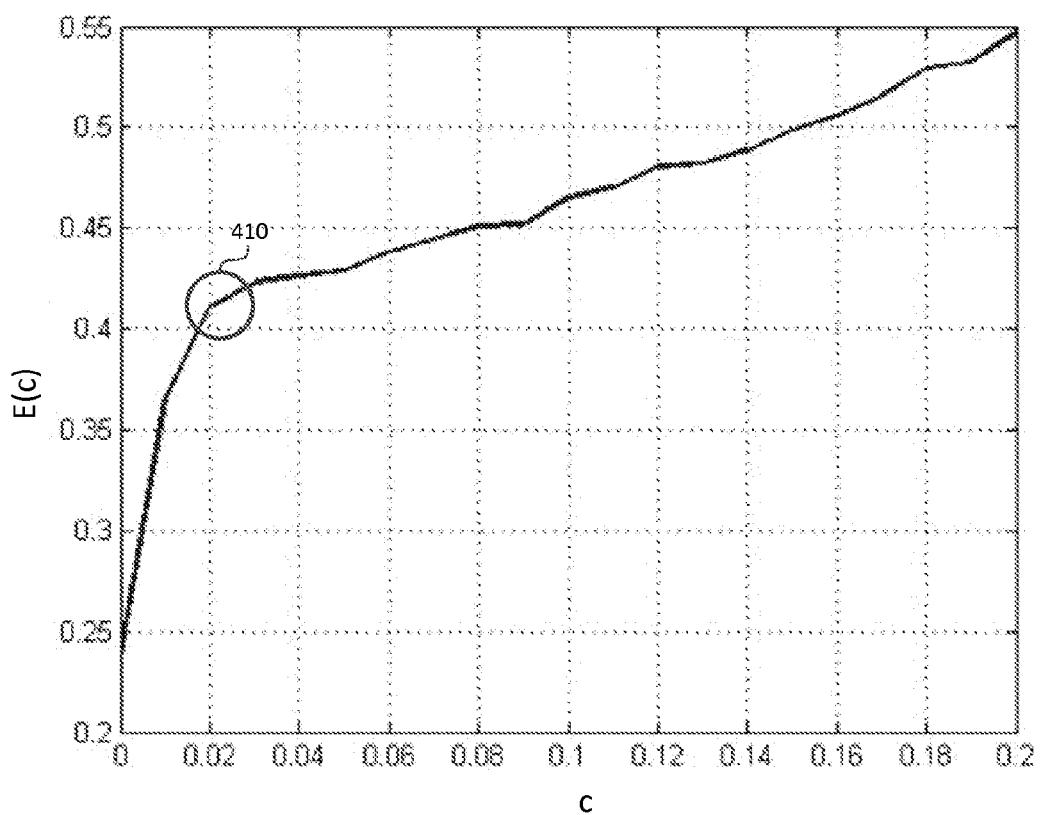
FIG. 4 depicts an example plot of normalized code-word usage according to an embodiment of this invention.

Let $$E(c) = \frac{UR(c)}{M(c) * N(c)} \quad (10)$$

denote the normalized code-word usage, then FIG. 4 depicts an example plot of E(c) values versus c. As depicted in FIG. 4, there is a "knee" point (410) at about c=0.02. Experimental results demonstrated that in an embodiment, this knee point provides a very good trade-off between code-word usage and compression efficiency. Hence, in an embodiment, a c value may be selected as the value for which the first derivative of the E(c) data curve is maximized. In summary, deriving c may include the following steps:

a) For each c, for a range of RGB values, computing the corresponding IPT-PQc values. The range of RGB values may include all possible RGB values, or it can only include the range of measured RGB values within a frame or a group of frames.
b) Identifying the number of valid chroma code-words in the IPT-PQc space; for example, by dividing the P/T space into an M(c)*N(c) grid and counting the valid code-words within that grid.
d) Determining the best c using an empirical or objective measure. For example, in one embodiment, one can compress a sequence of frames using different values of c and select as the best c the value that yields the best compression rate. Alternatively, in an embodiment, given a function of valid code-words versus c (e.g., UR(c) or E(c)), one can determine the best c as the value for which the first derivative $$\left( e.g., \frac{dE(c)}{dc} \right)$$

of such a function is maximized.

In some embodiments, code-word efficiency and the color cross-talk matrix may be determined using alternative color channel mappings, such as luminance (I) only, luma versus chroma (e.g., I vs P or I vs T) or even by using a full 3D volume representation of luma and chroma.

Chroma Reshaping

Given video data in the IPT-PQ or IPT-PQc color spaces, it was observed that the P and T color channels contain a lot of energy. Given a restricted bitrate for the compressed bit stream, direct encoding of these channels may be rather inefficient since any bit allocation for these channels reduces the bit allocation for the I channel. In an embodiment, a simple linear quantizer may be applied to reduce the dynamic range of the P and T channels without affecting overall picture quality. For example:

$$s_i^P = \quad (11)$$

$$Q_{BL}^P(v_i^P) = clip3\left( \left\lfloor w^P \frac{C_H^I - C_L^I}{v_H^I - v_L^I} \left( v_i^P - \frac{v_L^P + v_H^P}{2} \right) + mid + 0.5 \right\rfloor, 0, max \right),$$

denotes a quantizer function for the P channel, where for a given bit-depth BL (e.g., BL=10 bits), mid denotes a middle-range value (e.g., mid=$2^{BL-1}$), max denotes the maximum possible value (e.g., max=$2^{BL}-1$), $v_i^P$ denotes an input pixel value for the P channel, $s_i^P$ denotes the quantized value, $w^P$ is a weighting constant, typically less than 1 (e.g., $w^P$=0.8), $v_L^P$, $v_H^P$, $v_L^I$ and, $v_H^I$ are expected (or measured) low and upper limits of the input values at the I and P channels, and $C_L^I$ and $C_H^I$ are bounds for the quantized I-channel values (e.g., $C_L^I$=0, $C_H^I$=max). In effect, equation (11) quantizes the P/T channels so that the dynamic range ratio between luma (I) and chroma (P/T) is preserved.

A similar quantizer may also be used for the T channel. Given the quantization parameters in equation (11), the quantization of the P and T components in the encoder may be reversed by the decoder. In an embodiment, for IPT-PQc data, typical ranges of P/T data are within [−0.25 0.3]. The output range is selected to be within [−0.5 0.5].

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to coding and decoding for perceptually-quantized HDR video, such as those described herein. The computer and/or IC may compute any of a variety of parameters or values that relate to coding and decoding for perceptually-quantized HDR video processes described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to coding and decoding for perceptually-quantized HDR video as described above by executing software instructions in a program memory accessible to the processors. The invention may also be provided in the form of a program product. The program product may comprise any non-transitory medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

EQUIVALENTS, EXTENSIONS, ALTERNATIVES AND MISCELLANEOUS

Example embodiments that relate to coding and decoding for perceptually-quantized HDR video are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method to improve coding efficiency and perceptual uniformity for high dynamic range (HDR) video, the method comprising:
    accessing a first video signal in a first color space; and
    applying one or more color transformations to the first video signal to generate an output video signal in a perceptually-quantized opponent color space,
    wherein applying one or more color transformations to the first video signal to generate the output video signal further comprises:
        applying a first color transform to the first video signal to generate a second video signal in a linear primary color space;
        applying a color cross-talk transformation matrix to the second video signal to generate a third video signal in the linear primary color space;
        applying a perceptual quantizer to the third video signal to generate a fourth video signal in a perceptually quantized primary color space; and
        applying a second color transform to the fourth video signal to generate the output video signal in the perceptually-quantized opponent color space.

2. The method of claim 1, wherein the first color space is gamma-coded RGB (RGB gamma) or perceptually quantized RGB (RGB-PQ).

3. The method of claim 1, further comprising:
    applying a linearization function to the first video signal to generate a linearized first video signal and applying the first color transform to the linearized first video signal.

4. The method of claim 1, wherein the perceptually quantized color space is generated according to the SMPTE specification ST 1084.

5. The method of claim 1, wherein the linear primary color space is the LMS color space.

6. The method of claim 1, wherein the perceptually-quantized opponent color space is the perceptually quantized IPT color space (IPT-PQ).

7. The method of claim 1, wherein the color cross-talk transformation matrix comprises $$C = \begin{bmatrix} 1-2c & c & c \\ c & 1-2c & c \\ c & c & 1-2c \end{bmatrix}$$

wherein c is a constant.

8. The method of claim 7, wherein the value of c is determined as a function of the amount of valid code-words in the chroma components of the perceptually-quantized opponent color space.

9. The method of claim 8, wherein the value of c is determined as the value for which the first derivative of E(c)

is maximized, wherein E(c) denotes a function of valid code-words in the chroma components of the perceptually-quantized opponent color space as a function of c.

10. The method of claim 9 wherein the perceptually-quantized opponent color space comprises the IPT-PQ color space where P and T comprise the chroma components.

11. The method of claim 1, further comprising applying a reshaping function to the output video signal to generate a reshaped output function and compressing the reshaped output function with a video encoder to generate a coded bit stream.

12. The method of claim 11, wherein the reshaping function is non-linear for a luma component of the output video signal and linear for one or more chroma components of the output video signal.

13. The method of claim 12, wherein the reshaping function for a chroma channel (P) of the output video signal comprises an input-output function given by:

$$s_i^P = clip3\left(\left\lfloor w^P \frac{C_H^I - C_L^I}{v_H^I - v_L^I}\left(v_i^P - \frac{v_L^P + v_H^P}{2}\right) + mid + 0.5 \right\rfloor, 0, max\right),$$

where mid and max denote a middle-range value and a maximum value of the input to the reshaping function, $v_i^P$ denotes an input pixel value to the reshape function, $s_i^P$ denotes the corresponding output value, $w^P$ is a weighting constant, $v_L^P, v_H^P, v_L^I$ and, $v_H^I$ are low and upper limits of the output video signal for the luma (I) and the chroma (P) channels, and $C_L^I$ and $C_H^I$ are lower and upper bounds for the luma channel values of the reshaped output function.

14. The method of claim 1, further comprising compressing the output video signal with a video encoder to generate a coded bit stream.

15. In a decoder, a method to generate an uncompressed HDR video signal, the method comprising:
    decoding a coded bit stream with a decoder to generate a first HDR signal in a perceptually-quantized opponent color space;
    applying a first set of one or more color transformations to the first HDR signal to generate a second video signal in a first linear primary color space;
    applying the inverse of a color cross-talk transformation matrix to the second video signal to generate a third video signal in the first linear primary color space; and
    applying a second set of one or more color transformations to the third video signal to generate a fourth video signal in a second linear primary color space.

16. The method of claim 15, wherein the perceptually-quantized opponent color space comprises the IPT-PQ color space.

17. The method of claim 15, wherein the first linear primary color space comprises the linear LMS color space and the second linear primary color space comprises the linear RGB color space.

18. The method of claim 15, wherein the inverse of the color cross-talk transformation matrix comprises the inverse of $$C = \begin{bmatrix} 1-2c & c & c \\ c & 1-2c & c \\ c & c & 1-2c \end{bmatrix},$$

wherein c is a constant.

19. The method of claim 18, wherein the value of c is signaled from an encoder to the decoder.

20. The method of claim 15, further comprising applying a backward reshape function to the first HDR signal to generate a reshaped first HDR signal; and applying the first set of one or more color transformations to the reshaped first HDR signal to generate the second video signal.

21. An apparatus comprising a processor and configured to perform the method recited in claim 1.

22. A non-transitory computer-readable storage medium having stored thereon computer-executable instructions for executing a method with a processor in accordance with any claim 1.

* * * * *